Figure 1:
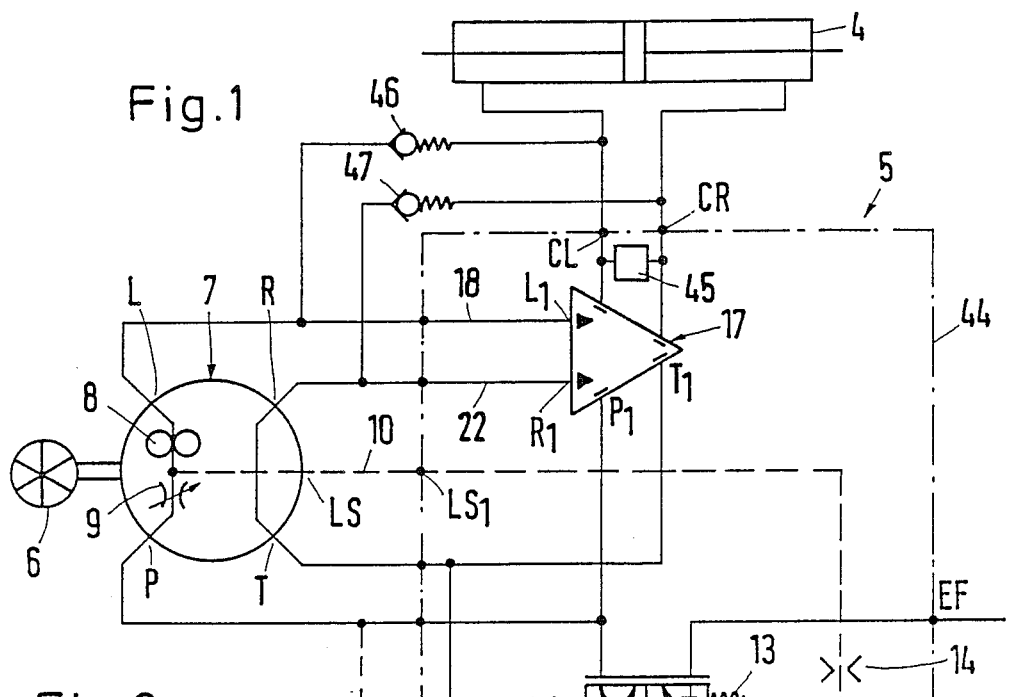

United States Patent [19]

Pedersen

[11] Patent Number: 4,774,807
[45] Date of Patent: Oct. 4, 1988

[54] CONTROL APPARATUS FOR HYDROSTATIC MOTOR VEHICLE STEERING APPARATUS

[75] Inventor: Harry E. Pedersen, Langeso, Denmark

[73] Assignee: Danfoss A/S, Nordborg, Denmark

[21] Appl. No.: 87,521

[22] Filed: Aug. 20, 1987

[30] Foreign Application Priority Data

Sep. 27, 1986 [DE] Fed. Rep. of Germany ....... 3632959

[51] Int. Cl.$^4$ .......................................... F15B 13/042
[52] U.S. Cl. ......................................... 60/384; 91/31; 91/462; 91/468
[58] Field of Search .................. 91/375 R, 28, 29, 6, 91/31, 363 R, 468, 452, 443, 462, 16, 19; 180/132, 148; 74/388 PS; 192/109 F

[56] References Cited

U.S. PATENT DOCUMENTS

| | | | |
|---|---|---|---|
| 2,999,482 | 9/1961 | Bower | 91/31 |
| 3,371,759 | 3/1968 | Sapolsky | 192/109 F |
| 3,623,509 | 11/1971 | Sesseler | 91/443 X |
| 3,771,802 | 11/1973 | Hiramatu et al. | 91/31 X |
| 4,566,477 | 1/1986 | Barker et al. | 91/29 X |

Primary Examiner—Edward K. Look
Attorney, Agent, or Firm—Wayne B. Easton

[57] ABSTRACT

The invention relates to hydrostatic steering control apparatus of the type having a hydrostatic steering motor which is connected to wheels to be steered and a steering wheel controlled metering or quantity setting device for controlling the hydraulic fluid supplied to the steering motor. A hydraulic amplifier connected to the steering motor has the characteristics of generating and transmitting undesired pressure pulses to the steering motor during steering switching operations. One way pre-stressed check valves are disposed respectively between the quantity setting apparatus motor ports and the steering motor ports. The check valves open in the direction of the steering motor ports and operate to allow bypassing the amplifier during the steering switching operations.

2 Claims, 2 Drawing Sheets

CONTROL APPARATUS FOR HYDROSTATIC MOTOR VEHICLE STEERING APPARATUS

The invention relates to a control apparatus for hydrostatic motor vehicle steering apparatus, comprising quantity setting apparatus actuatable by a steering wheel and equipped with a load pressure sensing conduit, a pump pressure regulating valve controlled by the load pressure, and an amplifier which has two motor connections for connecting to a steering motor, a pump connection feedable with regulated pump pressure, a container connection and two control connections which are connectable by way of the quantity setting apparatus to the pump connection and container connection, respectively, as well as a directional valve which is actuatable by the pressure at the control connection under pressure and is closed in the neutral position.

Such a control apparatus is known from DE-PS No. 29 33 847. The amplifier comprises a control circuit which is fed by way of the quantity setting apparatus and an operating circuit which is fed directly from the regulated pump pressure. The metered control quantity flows through a change-over apparatus formed at the directional valve and through a control valve to a junction. The operating quantity flows to the junction by way of a pressure regulator and an operating valve. The sum of the control quantity and operating quantity then reaches the steering motor by way of the directional valve. The pressure regulator ensures that the pressure in front of the operating valve and that in front of the control valve are equal. The two valves are arranged at a common slide member so that the operating quantity is proportional to the control quantity. In such a control apparatus, the pump, amplifier and steering motor can be closely juxtaposed so that the flow losses for the operating quantity, that is to say the largest proportion of the pressure fluid feeding the steering motor, will be low. It is only the quantity setting apparatus that has to be installed near the driver's cabin. However, since the control quantity is low, the flow losses caused thereby are likewise low. A combination of amplifier and load pressure-controlled priority valve is, for example, marketed as Danfoss-Type OSQA or OSQB and an associated quantity setting apparatus as Danfoss-Type OSPBX (see Danfoss Prospectus HK. 20. A7. 03 'Hydraulic Steering Components', June 1986, pages 20 and 40).

It has been found in practice that pressure pulses occur in the steering motor if the steering wheel is actuated rapidly. This is particularly inconvenient in the case of articulated vehicles in which a front and rear portion are interconnected by a pivot joint and the driver's cabin is located approximately over the pivot. In this case, the pressure pulses in the steering motor lead to sudden transverse displacements in the vicinity of the driver's cabin and this is most uncomfortable for the driver.

The invention is based on the problem of providing a control apparatus of the aforementioned kind in which the stated pressure pulses in the steering motor are entirely or for the most part avoided.

This problem is solved according to the invention in that each motor connection is connected to its associated control connection by way of a prestressed check valve which opens towards the steering motor.

This construction is based on the following considerations. The speed of response of the slide of the directional valve is limited, whether by its own mass or through throttling in the connection to the control conduit. This is essential so that, as a result of sudden switching off upon termination of a steering manoeuvre, the parts of the steering motor that continue to move under their inertia will not produce excessive pressures. If, upon commencement of a steering operation, the throttle of the quantity setting apparatus is opened, the pump pressure rises rapidly because the load pressure which has dropped behind the said throttle is substantially equal to the pump pressure but the valve seeks to keep the pump pressure above the scanned load pressure by a predetermined amount. When the directional valve then opens after a certain delay, this high pressure acts with an impact in the steering motor and this explains the uncomfortable pressure pulses.

If one employs the prestressed check valves, the build-up of load pressure is limited to the value at which the check valve responds. This is because as soon as this response value has been reached, pressure fluid can flow past the amplifier to the steering motor. In this way, the pump pressure can likewise not exceed a predetermined value. If, now, the directional valve opens somewhat later, there is no danger of any pressure pulse or at least no disturbing pressure pulse. This is firstly because the hydraulic pressure supplied by way of the directional valve is limited. Secondly, the steering motor had already been supplied with fluid by way of the check valve so that a certain amount of pressure was already building up in the steering motor. Altogether, therefore, one obtains a soft start to the steering movement. As soon as the amplifier has become effective, the check valve closes. During normal operation, therefore, the check valves are inoperative.

The smaller the response value of the check valves, the lower one can keep the pump pressure upon opening of the directional valve and thus the danger of a pressure pulse. However, the lower the response value, the larger will be the amount of pressure fluid which flows through the quantity setting apparatus without amplification, which leads to offsetting of the steering wheel in relation to the steering motor. A good compromise is obtained if the check valve opens at a pressure difference of 10 to 20 bar. In this way, the pump pressure on commencement of the steering movement is kept sufficiently low. The steering wheel offset is sufficiently low. In addition, the response value is higher than the pressure drop occurring in the amplifier during operation.

Figure 2:
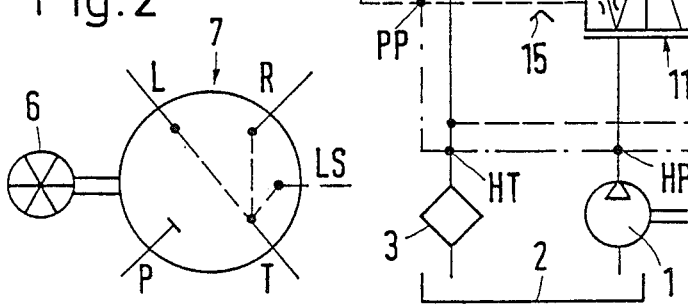
Figure 3:
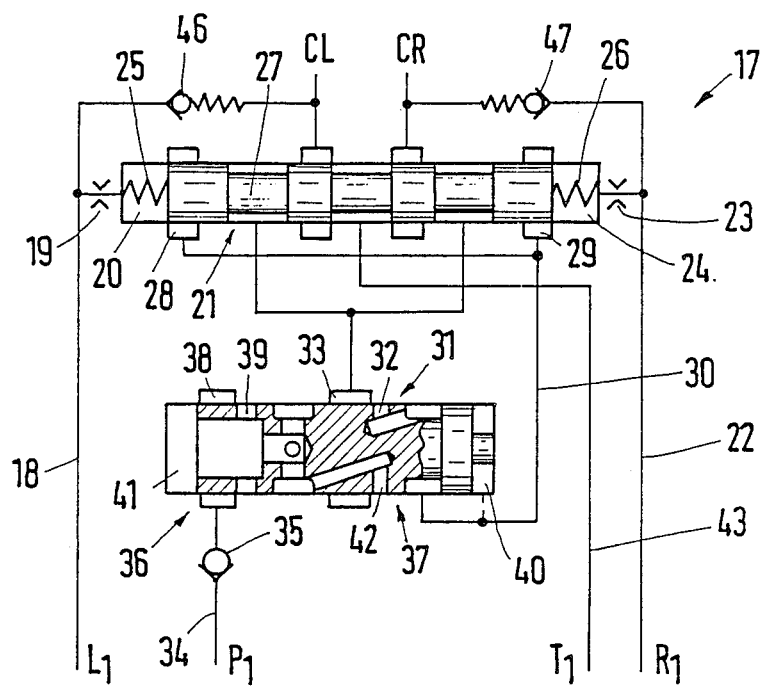

A preferred example of the invention will now be described with reference to the drawing, wherein:

FIG. 1 is a block diagram of a motor vehicle steering apparatus having a control apparatus according to the invention, FIG. 2 diagramatically illustrates the quantity setting apparatus in the neutral position, and FIG. 3 is a diagramatic representation of the amplifier construction.

According to FIG. 1, the steering apparatus comprises a motor-driven pump 1, a container 2 with a preceding filter 3, a steering motor 4 and a control apparatus 5.

The latter comprises a quantity setting apparatus 7 actuatable by a steering wheel 6 and having a metering motor 8, at least one throttle 9 responsive to the steering wheel movement and actuation of the metering motor 8, as well as a load pressure sensing conduit 10 branching off between the throttle 9 and metering motor 8. Further, the quantity setting apparatus comprises a pump connection P, a container connection T, two control connections L and R and a load pressure connection LS.

FIG. 1 illustrates the quantity setting apparatus 7 during the steering operation and FIG. 2 in its neutral position. It will be seen that the two control connections L and R as well as the load signal connection LS are connected to the container connection T in the neutral position, that is to say all three connections are kept free from pressure.

The pump 1 is followed by a pump pressure-regulating priority valve 11 which is adapted to deliver excess pressure fluid by way of an outlet EF to the container or to a further consumer and also causes the pump pressure that is to be fed to the control apparatus 5 to follow the load pressure. For this purpose, the slide member 12 of the priority valve 11 is influenced on the one side by the load pressure supplied by way of the connection LS 1 and by a spring 13 and on the other side by the regulated pump pressure which is supplied by way of the connection PP. Throttles 14 and 15 are provided for damping. In order that the load pressure and thus the pump pressure cannot assume excessively high values, an overflow valve 16 is provided.

The control apparatus also comprises an amplifier 17 having a pump connection P1, a container connection T1, two motor connections CL and CR and two control connections L1 and R1. The amplifier 17 may be of a form known from U.S. Pat. No. 4,364,302. It is shown in its neutral position in FIG. 3.

The control connection L1 is connection to the head chamber 20 of a directional valve 21 by way of a control conduit 18 and a throttle 19. The control connection R1 is connected to the head chamber 24 of this directional valve 21 by way of a control conduit 22 and a throttle 23. Both head chambers contain a neutral position spring 25 or 26. Upon displacement of the slide member 27 of the directional valve 21, one of two apertures 28 and 29 of a change-over apparatus will open so that the metered control quantity supplied by way of the control conduit 18 or 22 can flow through a connecting conduit 30 to a control valve 31 which is formed by a bore 32 and an anular chamber 33. The parts described so far form a control circuit. An operating circuit comprises the operating conduit 34 coming from the pump connection P1 and having a check valve 35, a pressure regulator 36 and an operating valve 37. The pressure regulator is formed by the co-operation of the anular groove 38 with bores 39, the pressure in the head chamber 40 in front of the control valve 31 being kept equal to the pressure in the head chamber 41 in front of the operating valve 37. The operating valve is represented by the bores 42 and anular groove 33. The latter therefore forms a junction for the control quantity and operating quantity. This is transmitted depending on the direction of displacement of the directional valve 21 by way of the operating connection CL or the operating connection CR. The return is through the respective other operating conduit, the directional valve 21 and a container conduit 43. Since the pressure drop at the control valve and the pressure drop at the operating valve 37 are equal as a result of the pressure regulator 36, and since the corresponding control orifices 32 and 42 also open in proportion to each other, the operating quantity is proportional to the control quantity.

The priority valve 11, overflow valve 16 and amplifier 17 are accommodated in a block 44 which can also receive a valve arrangement 45 with suction valves and over-pressure valves. This block 44 has a connection HP for the pump, a connection HT for the container, the aforementioned connections LS1, PP and EF as well as four connections which are connected to the amplifier connections L1, R1, P1 and T1.

There are also two prestressed check valves 46 and 47 which open towards the steering motor 4. The check valve 46 is connected between the control connection L1 of the amplifier and the associated motor connection CL. The check valve 47 is disposed between the control connection R1 of the amplifier and the associated motor connection CR. The valves open at a pressure difference of 10 to 20 bar.

In operation, when the quantity setting apparatus 7 is turned out of the neutral position of FIG. 2 into the operating position of FIG. 1, the load pressure sensing conduit 10 is separated from the container pressure and connected to the outlet of the throttle 9. Consequently, the priority valve 11 is moved so that the regulated pump pressure rises rapidly. Since the slide member 27 of the directional valve 21 only opens the change-over apparatus 28, 29 after a certain delay, the pump pressure could reach values of 100 bar and higher and give rise to a pressure pulse in the steering motor on opening of the directional valve 26 if the check valves 46 and 47 had not been provided. If the quantity setting apparatus 7 is actuated so that the steering motor 4 is to move to the left, i.e. if pressure is built-up in the control conduit 18, the check valve 46 will open as soon as its response value has been reached, pressure fluid being fed into the steering motor 4 whilst bypassing the amplifier 17. Consequently, the load pressure and therefore also the pump pressure are limited. No disturbing pressure pulse occurs. The steering operation is started smoothly. On turning the steering wheel 6 in the opposite direction, the check valve 47 becomes functional in an analagous manner.

I claim:

1. Hydrostatic steering control apparatus, comprising, a hydrostatic steering motor having left and right motor ports, a pump and a tank, a steering wheel controlled quantity setting apparatus having a load pressure sensing conduit and left and right motor connections, said quantity setting apparatus having pump and tank connections, a pump pressure regulating valve operably disposed between said pump and said quantity setting apparatus pump connection, a hydraulic amplifier having two motor connections for connection to said steering motor ports and a two directional valve having two ports connected to said quantity setting apparatus motor connections, said amplifier having a pump connection connected to said pressure regulating valve and a tank connection connected to said tank, said amplifier generating and transmitting undesired pressure pulses to said steering motor during switching operations, and one way prestressed check valve respectively between said quantity setting apparatus motor ports and said steering motor ports opening in the direction of said latter ports for bypassing said amplifier during said switching operations.

2. Control apparatus according to claim 1 wherein said check valves open at a pressure difference of 10 to 20 bar.

* * * * *